Figure 1:
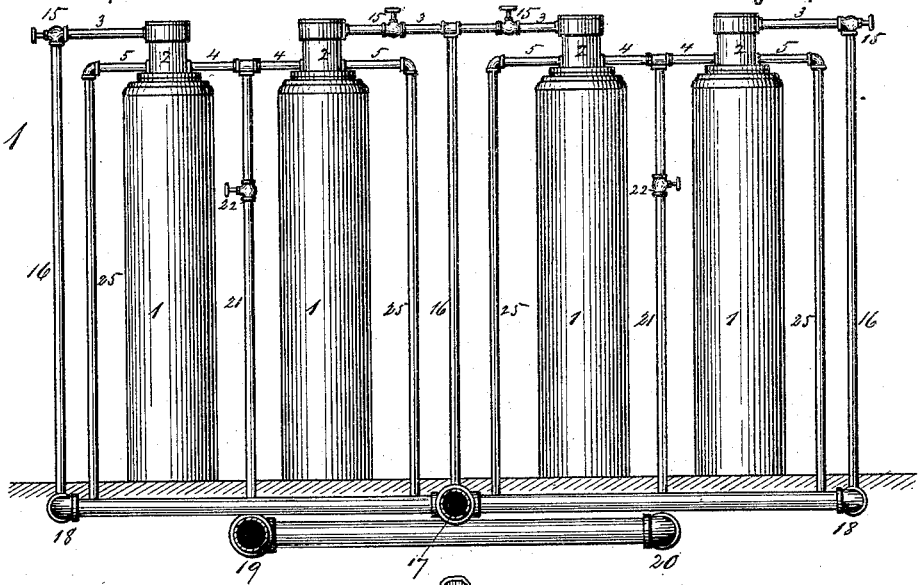

(No Model.) 2 Sheets—Sheet 1.

O. H. & W. M. JEWELL.
FILTERING APPARATUS.

No. 431,229. Patented July 1, 1890.

Witnesses:
Otto Luebkert
Owen V. Storey

Inventors:
Omar H. Jewell
William M. Jewell
By Wm. L. Lotz
Their Attorney (No Model.) 2 Sheets—Sheet 2.

O. H. & W. M. JEWELL.
FILTERING APPARATUS.

No. 431,229. Patented July 1, 1890.

Witnesses
Otto Luebkert
Owen V. Sinskey

Inventors
Omar H. Jewell
William M. Jewell
By Wm. H. Lotz
their Attorney

UNITED STATES PATENT OFFICE.

OMAR H. JEWELL AND WILLIAM M. JEWELL, OF CHICAGO, ILLINOIS.

FILTERING APPARATUS.

SPECIFICATION forming part of Letters Patent No. 431,229, dated July 1, 1890.

Application filed April 3, 1890. Serial No. 346,397. (No model.)

*To all whom it may concern:*

Be it known that we, OMAR H. JEWELL and WILLIAM M. JEWELL, citizens of the United States of America, residing at Chicago, in the county of Cook and State of Illinois, have invented certain new and useful Improvements in Filtering Apparatus, of which the following is a specification, reference being had therein to the accompanying drawings.

This our invention relates to apparatus for filtering water, and particularly for filtering large quantities—as, for example, the entire water-supply for a town or city. The old system used to be to build tanks of great size, where one or two were capable of filtering the required quantity of water, and by an example we shall endeavor to give an explanation of the disadvantage of such a system. Now, supposing two hundred thousand gallons of purified water were required per day, which by the previous system would require a tank of eight feet diameter by five feet high, this tank would require heavy bracing and supports to withstand a pressure of about one hundred and twenty-five pounds, and would provide a filtering-surface of about fifty square feet, containing about two hundred cubic feet of sand or other filtering material. The weight of such tank would be about five tons, of the filtering material about ten tons, and of the water about two tons—in all about seventeen tons. So it will be seen strong and well-built foundations would be required for sustaining this weight, and pipes five inches diameter would be necessary for supplying and carrying off the water which the filter would be expected to purify. Our extended experience in the purification of waters has taught us that it is not an easy matter to keep the filter-bed in a clean and wholesome state when contained in so large a tank, since the water used for washing so large a bed must be distributed in such a manner that it will thoroughly reach every part of the filtering material as well as the floor of the filtering-tank for separating and carrying off every particle of impurities settled therein, all of which are serious objections.

The object of this our invention is to provide a series of filters in the shape of a battery system—for example, for purifying two hundred thousand gallons each day, to place fifty filtering-tanks, each only fourteen inches diameter and five feet high, so each filter would have one square foot of filtering-surface and to contain only four cubic feet of filtering material, each such filter to be tested to one hundred and fifty pounds hydrostatic pressure, and the water to each of these filters to be supplied through only a three-fourths-inch pipe, and each one connected to the main pipe independently of the others, all the filters to be arranged in groups in the most convenient manner for making connections with the main pipes. The average weight of each such filter would be about five hundred pounds, so only very light foundations would be required. Another great advantage with such a battery system would be that part of the filters may be washed out, while the remaining part would continue filtering; or in case a filter became worn or out of order it might be disconnected, removed, and repaired without interfering with the remainining ones; and as the consumption of water increases the battery may be readily enlarged proportionally by attaching more small filters, all of which may be done with a very small additional expense.

Another object of our invention is to so construct such small filters that with cleaning the washout water would be directed toward the bottom as well as toward the sides and top for thoroughly removing all impurities, and to provide the same with devices that during the washout operation will break up lumps and balls which may form in the filtering-bed from the impurities in the water.

With the above objects in view our invention consists of the novel devices and combinations of devices hereinafter described and specifically claimed.

Figure 2:
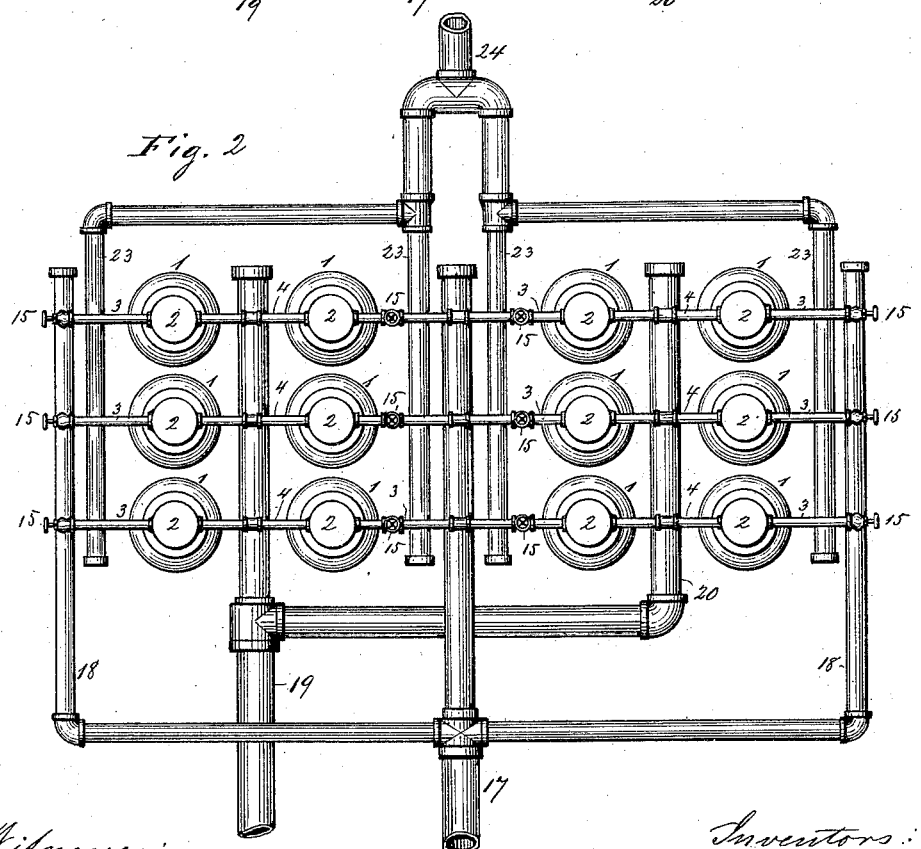
Figure 6:
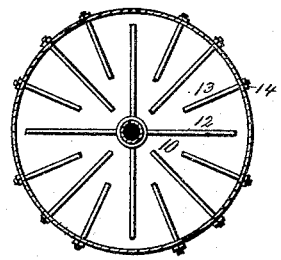
Figure 5:
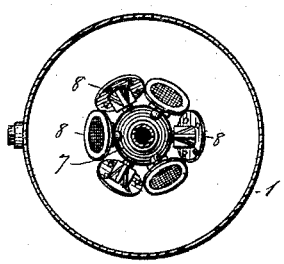
Figure 3:
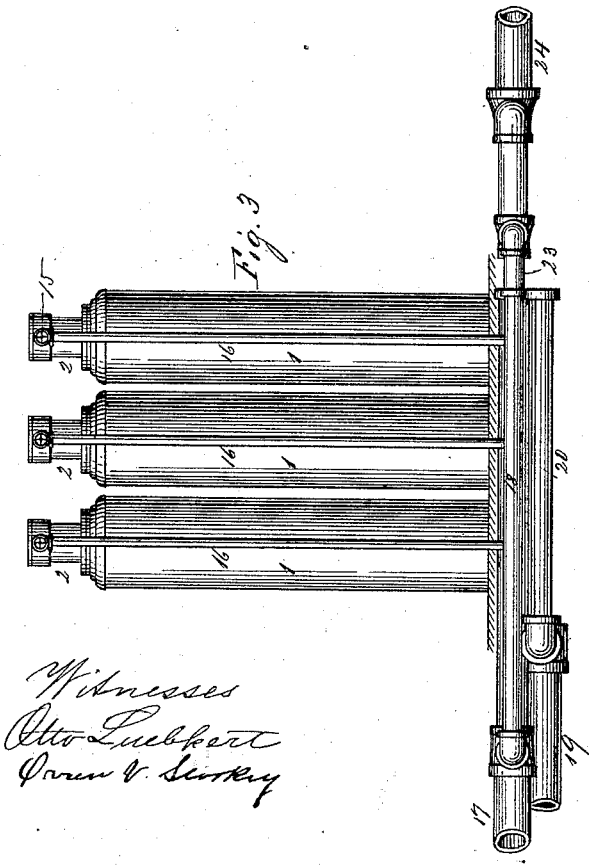
Figure 4:
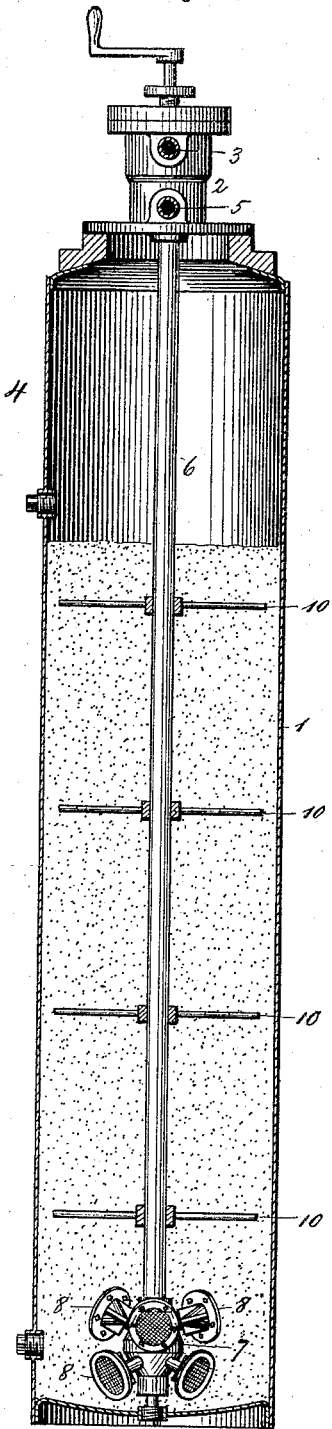

In the accompanying drawings, Figure 1 represents a side elevation, Fig. 2 a plan, and Fig. 3 an end elevation, of a group of small filters; Fig. 4, a vertical section of one of the filters; Fig. 5, a sectional plan of the lower part of the filter, showing the strainer-cups; and Fig. 6 a sectional plan of the filter, showing one of the grates therein.

Corresponding referential characters in the several figures of the drawings designate like parts.

The casing 1 of each filtering-tank, being a cylindrical shell closed on top and bottom, is provided on top with a valve 2 of the kind described in the application, Serial No. 332,590, filed by William M. Jewell, one of the present applicants, on December 4, 1889. This valve 2 is connected with supply-pipe 3, pure-water-discharge pipe 4, and washout-water-discharge pipe 5, and with the central stand-pipe 6, the same being adjustable for all the necessary communications between these pipes and the tank for the required operations of filtering, washing out, and rewashing the tank and filtering material. To the lower end of pipe 6, near the concaved bottom of the tank, is coupled a globular chamber 7, to which are secured a series of strainer-cups 8, to be on radial positions at different angles, a part of them pointing slantingly downward, a part of them sidewise, and the balance slanting upward, each cup having secured upon its flaring mouth a sheet of wire-gauze or perforated metal. This globular chamber 7 is supported from below on a screw-plug 9 in the center of the bottom of the tank. Between the globular chamber 7 and the top of the filtering material a series of grates 10 are formed, which either may be made, as shown in the drawings, by securing upon pipe 6 collars 11, each having secured a series of radial arms 12 by rods 13, radially secured by having screw-threaded ends tapped into screw-threaded holes of the shell 1 and rigidly secured by jam-nuts 14 upon their exterior ends, with the several rods equally divided on a horizontal plan within the area of the tank, or these grates 10 may be made each to be a single casting secured within the filtering-tank in any suitable manner.

For filtering the water supplied by pipe 3, it will pass into the tank direct through the valve, and after trickling through the filtering material will enter the strainers, will thence pass up in pipe 6, being discharged through pipe 4. For washing out the filter, the valve 2 is adjusted to admit the water from the supply-pipe 3 into pipe 6, to pass down therein and issue from the strainers 8 with force and in multiple jets, thereby striking the bottom and sides of the tank, and then with rising to the top this water will whirl up and bring into commotion the filtering material, whereby lumps and balls formed therein will be moved into contact with the grates 10 for breaking them up, when all the impurities collected in the filtering material will be loosened, separated, and carried off with the water that will now escape through pipe 5, and for a rewash the valve 2 is adjusted the same as for filtering, excepting that the filtered water rising up in pipe 6 will be discharged through pipe 5.

When these filters are placed in conjunction to form a group, the supply-pipes 3 are provided each with a stop-valve 15, and are coupled by means of upright pipe 16 with the main supply-pipe 17 or its branches 18. The purified-water-discharge pipes 4 of the several filters are connected each with the main pipe 19 or to its branch 20 by upright pipes 21, each provided with a stop-valve 22, and the washout-pipes 5 of the several filters are connected each with the branches 23 of the waste-pipe 24 by means of upright pipes 25. It will thus be readily seen each filtering-tank 1 will operate entirely independent of the other tanks and can separately be washed out or may be disconnected and removed without interfering with the operations of the other tanks and that any number of small filters can thus be connected to operate in conjunction, receiving their water-supply from a single main pipe and discharging the purified water also into a single main conducting-pipe.

What we claim is—

1. The combination of a series of small filters to operate in conjunction, all connected with the same main pipes by branch pipes for independent operation, and each provided interiorly with a central stand-pipe for the double purpose of carrying off the filtered water and of supplying the washout water, with a globular chamber coupled to the lower end of such stand-pipe, and with a series of strainer-cups connected with such globular chamber and pointing partly downward, partly sidewise, and partly upward, substantially as set forth.

2. The combination of a series of small filters to operate in conjunction, all connected with the same main pipes by branch pipes for independent operation, and each provided interiorly with a central stand-pipe for the double purpose of carrying off the filtered water and of supplying the washout water, with a globular chamber coupled to the lower end of such stand-pipe, with a series of strainer-cups connected with such globular chamber, and with a series of rigid grates below the line of the filtering material, all substantially as set forth.

3. A filtering-tank for the purpose described provided with a valve capable of adjustment for the several operations of filtering, washing out, and rewashing, with an interior central pipe for the double purpose of carrying off the filtered water and of supplying the washout water, with a globular chamber coupled to the lower end of such central pipe, with a series of strainer-cups connected with such globular chamber in a manner to point partly downward, partly sidewise, and partly upward, and with a series of rigid grates within the filtering material, all substantially as set forth.

In testimony whereof we affix our signatures in presence of two witnesses.

OMAR H. JEWELL.
WILLIAM M. JEWELL.

Witnesses:
WILLIAM H. LOTZ,
OTTO LUEBKERT.